J. W. STANTON.
Methods of Extinguishing Fire in Oil-Tanks, &c.
No. 145,134
Patented Dec. 2, 1873.
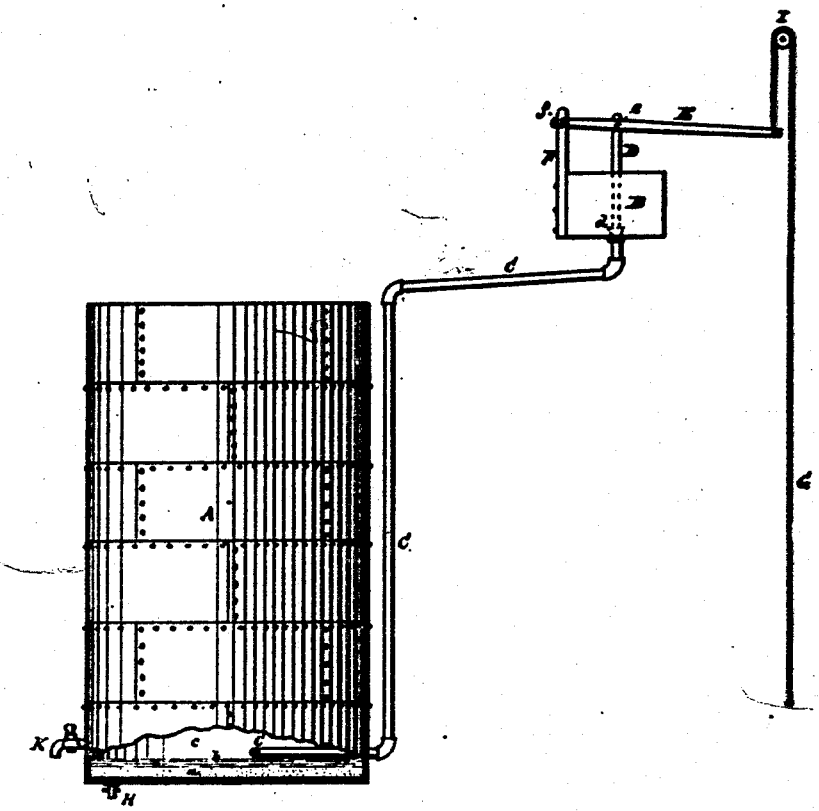
Witnesses.
Inventor.
John W. Stanton

UNITED STATES PATENT OFFICE.

JOHN W. STANTON, OF BROOKLYN, NEW YORK, ASSIGNOR TO J. H. COLTON, OF SAME PLACE; SAID COLTON ASSIGNOR OF ONE-HALF HIS RIGHT TO CHARLES M. MARTIN, OF NEW YORK.

IMPROVEMENT IN THE METHODS OF EXTINGUISHING FIRE IN OIL-TANKS, &c.

Specification forming part of Letters Patent No. 145,124, dated December 2, 1873; application filed March 12, 1872.

*To all whom it may concern:*

Be it known that I, JOHN W. STANTON, of Brooklyn, in the State of New York, have invented a new and useful Method of Extinguishing Fire in Oil or other Inflammable Liquids; and I do hereby declare the following to be a full and correct description of the same, reference being had to the accompanying drawings, in which—

Figure 1 is a vertical section of one form of apparatus adapted to the application of my invention to the extinguishing of fire in an oil-tank.

My invention consists in the introduction of carbonic-acid gas beneath the surface of any burning liquid for the purpose of extinguishing the fire.

This I effect either by generating the carbonic-acid gas in the same vessel which is employed to hold the inflammable liquid, or by conducting the gas in pipes from any suitable reservoir placed outside of the containing-vessel, and allowing it to escape below the surface of the liquid.

The first of these methods is that represented in the accompanying drawing. A marks an ordinary oil-tank, such as is commonly employed at the oil-wells to receive the crude petroleum as it comes from the pumps. In the bottom of this tank is placed a layer of marble-dust, carbonate of soda, or other suitable material for the generation of carbonic-acid gas. Water is then introduced to the depth of a few inches above the surface of the marble-dust. The oil contained in the vessel floats upon the surface of the water. A vessel, B, containing a suitable acid is connected by a pipe, C, with the bottom or lower part of the tank A. The opening of the pipe C into the vessel B is controlled by a valve, operated by a lever, to which the cord is attached after running over the pulley. The lever is pivoted to a standard fixed to the side of the vessel B, and to the upper end of the valve-rod, as shown.

By pulling the cord, the valve is raised and the acid in vessel B passes down pipe C into the bottom of tank A, where it decomposes the carbonate of lime or soda, and liberates carbonic-acid gas, which, rising through the water and oil, extinguishes the fire burning on the surface of the oil.

Other forms of apparatus may be adopted with equally good results. I have contemplated the use of any of the ordinary generators of carbonic-acid gas, connected with the reservoir of oil, naphtha, or other inflammable liquid, by a pipe entering near the bottom of the reservoir, or by a flexible or other tube having a nozzle introduced in any convenient manner below the surface of the liquid.

What I claim as my invention, and desire to secure by Letters Patent, is—

An apparatus, irrespective of form, in which the introduction of carbonic-acid gas beneath the surface of oil, petroleum, naphtha, or other inflammable liquid is employed to effect the more perfect diffusion of said gas on the surface of such liquid, for the purpose of extinguishing fire burning upon said surface, said apparatus consisting of any suitable device, either for generating carbonic-acid gas beneath the surface of the oil within the oil-tank, or for introducing said gas beneath the surface of the liquid from any convenient generator placed outside of the oil-tank, all substantially as described.

The above specification of my said invention signed and witnessed at Washington this 12th day of March, A. D. 1872.

JOHN W. STANTON.

Witnesses:
EDM. F. BROWN,
CHAS. F. STANSBURY.